Feb. 13, 1940.   F. C. BEST   2,190,227
MOTOR VEHICLE
Filed Oct. 29, 1937   2 Sheets-Sheet 1
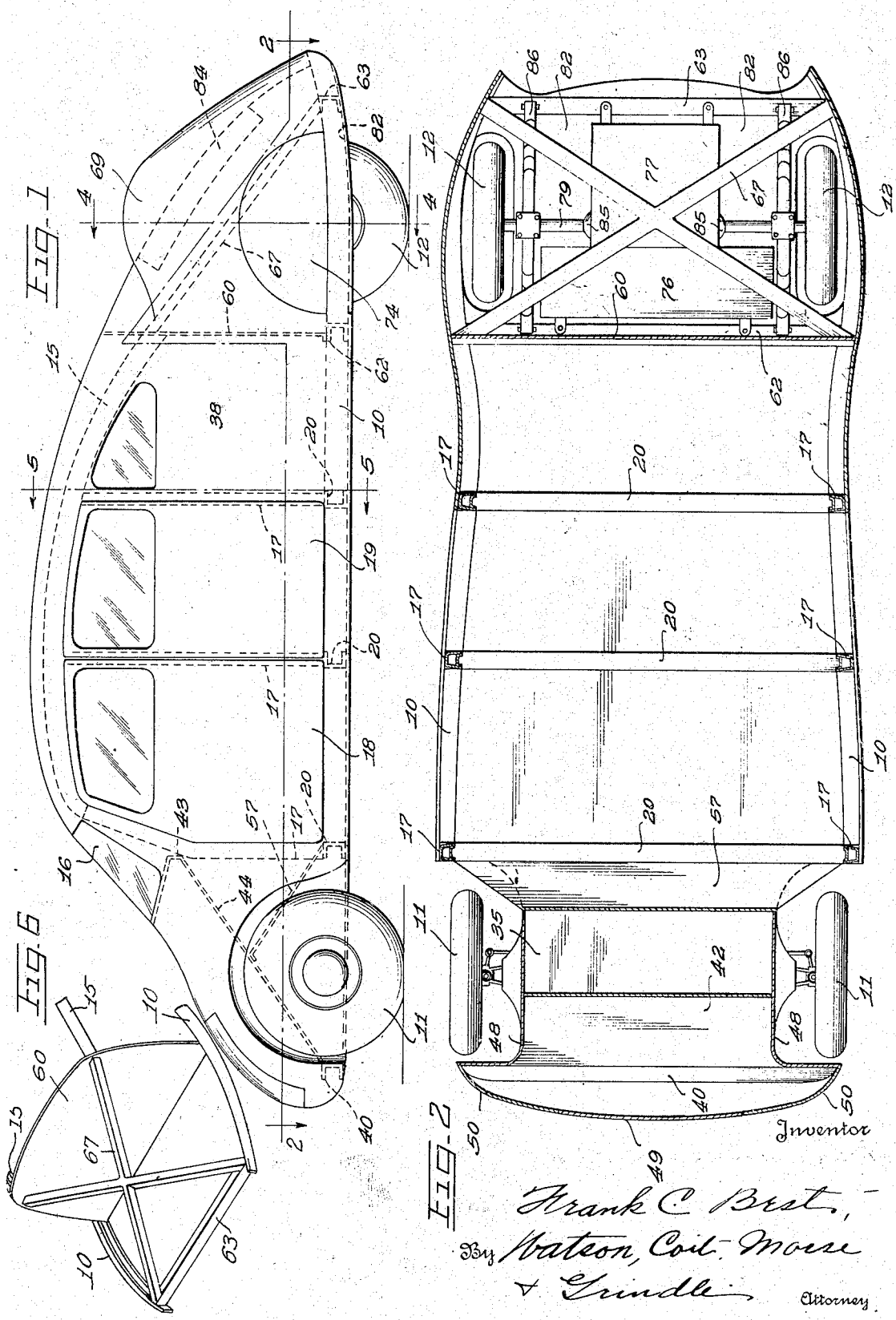
Inventor
Frank C. Best,
By Watson, Coit, Morse
& Grindle
Attorney

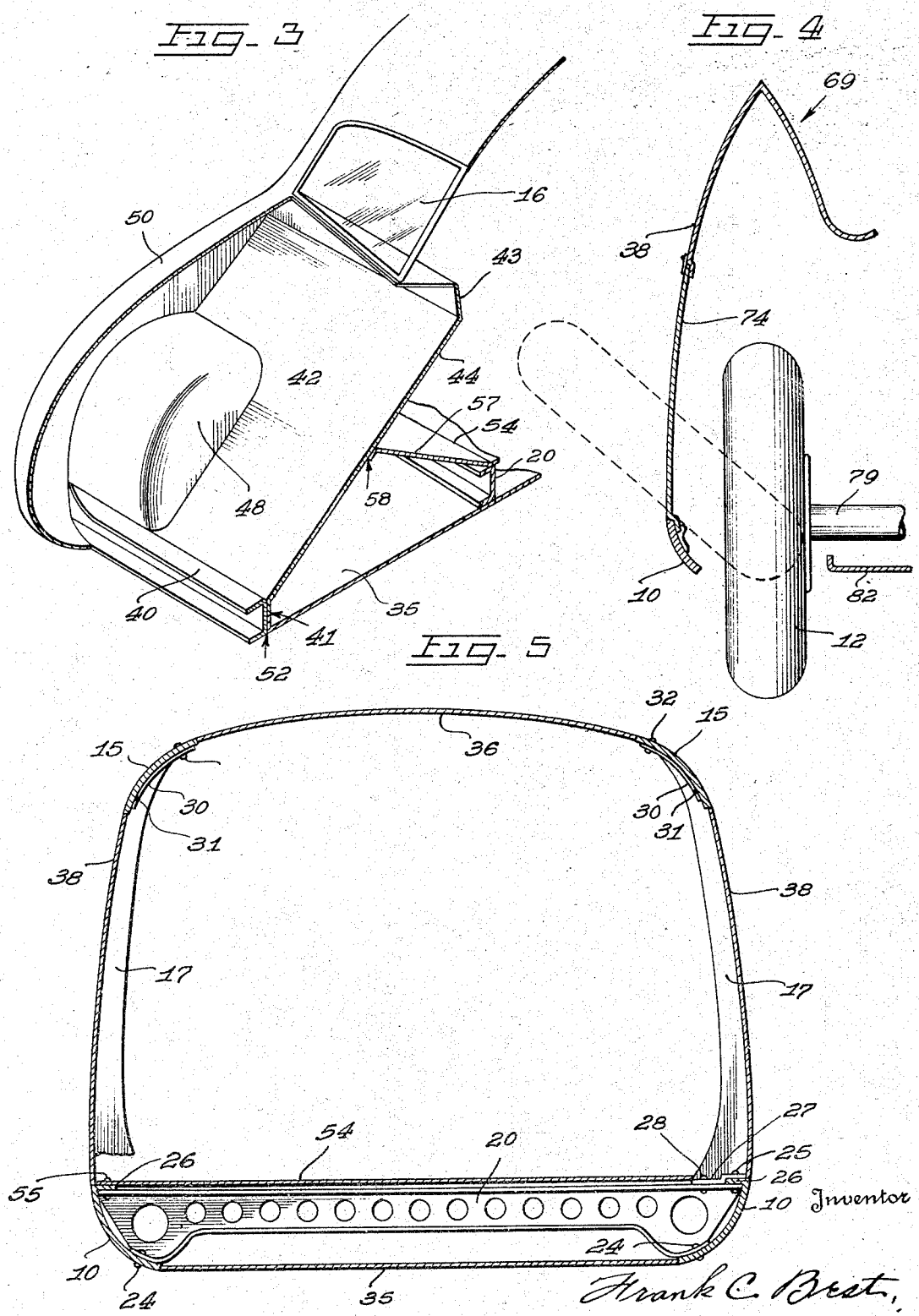

Patented Feb. 13, 1940

2,190,227

UNITED STATES PATENT OFFICE 2,190,227

MOTOR VEHICLE

Frank C. Best, Detroit, Mich., assignor to Packard Motor Car Company, Detroit, Mich., a corporation of Michigan Application October 29, 1937, Serial No. 171,793

11 Claims. (Cl. 296—28)

This invention relates to improvements in motor vehicles and is more particularly concerned with vehicle body construction. It is the principal object of the invention to provide a motor vehicle body which is characterized by extreme lightness and sturdiness, which is relatively inexpensive to construct and easily assembled, and which is so formed as to render the moving parts of the vehicle and the driving mechanism therefor readily accessible for repair and replacement.

It is a feature of the invention that the more rigid frame elements of the body construction are utilized as part of the exterior of the body, the relatively thin panel sections which ordinarily form the entire exterior or skin of the body being butt-welded to such frame elements so as to lie flush with the exterior surfaces of the latter and to form in effect continuations of such surfaces.

More specifically, it is an object of the invention to provide a vehicle body having longitudinally extending rigid frame elements defining the exterior surfaces of the body, these frame elements extending along the sides of the roof and floor of the body and being rigidly united by upstanding pillars and a minimum number of structural reinforcing members in such manner as to afford maximum resistance to weaving of the body as the result of torsional stresses applied thereto and to deformation of the body in the event of collision.

Further objects and features of the invention will be apparent from the following description taken in connection with the accompanying drawings, in which Figure 1 is a side elevation of a vehicle illustrating the application of the principles of the invention thereto;

Figure 2 is a longitudinal sectional view taken substantially on the line 2—2 of Figure 1;

Figure 3 is a sectional perspective view of the forward end of the vehicle shown in Figure 1;

Figure 4 is a transverse sectional view taken substantially on the line 4—4 of Figure 2;

Figure 5 is a transverse sectional view taken substantially on the line 5—5 of Figure 1; and Figure 6 is a diagrammatic perspective view illustrating the relation of the principal elements at the rear of the body.

It will be noted by reference to the drawings that the invention has been illustrated as applied to a vehicle body of such shape as to offer minimum wind resistance, to which form of body the invention readily lends itself. It will nevertheless be appreciated that certain features of the invention are applicable to widely diverse types of vehicle body. It will further be understood that while specific language is employed herein to describe the embodiment of the invention selected for the purpose of illustration, no limitation of the scope of the invention is thereby intended, various further modifications and alterations being contemplated such as would occur to one skilled in the art to which the invention relates.

Referring first to the contour of the body as illustrated in Figures 1 and 2, it will be noted that the forward end of the vehicle is formed to provide a rounded and generally blunt nose which is somewhat depressed to reduce air lift and consequently induced drag. The cross-sectional area of the body reaches its maximum value at a point somewhat forward of the mid length of the vehicle, and the downward slope of the body roof toward the rear of the vehicle is as small as possible consistent with standard requirements of over-all length. In order that smooth air flow may be maintained over the extreme rear of the body, the vehicle tail is shaped to provide fins at either side thereof which are so constructed and positioned as to suppress air flow seperation over the tail. The underside of the vehicle is substantially flat and the entire body is enclosed by substantially continuous and smoothly curving surfaces which are interrupted only to the extent necessary to accommodate the vehicle road wheels. The precise contour of the body forms no part of the instant invention except insofar as the inventive features outlined hereinafter serve to form and rigidly support this body and to minimize the weight and increase the sturdiness thereof.

The sides of the floor or bottom of the body are defined by longitudinally extending frame elements 10 which may be conveniently referred to as longérons, the cross-sectional contour of these elements throughout the major portion of their length being indicated more particularly in Figure 5. Each of the elements 10 extends preferably from a point immediately at the rear of the front road wheels 11 of the vehicle to a point at the extreme rear of the vehicle, being disposed outside of and extending across the face of the rear road wheels 12. Defining the sides of the top or roof of the vehicle are longitudinally extending frame members or longérons 15, the latter terminating at their forward ends adjacent the upper edge of the windshield 16 and having their rearward ends extended to the rear of the passenger or lading compartment. Extending between and secured to the longérons 10 and 15 are a plurality of upright pillars 17, these pillars defining the usual door openings and the intermediate pair of pillars constituting supports on which the forward and rearward doors, indicated at 18 and 19 respectively, are hinged. Extending between the longérons 10 and secured thereto are a plurality of cross frame members 20, one member 20 being associated with and preferably additionally secured to each pair of oppositely disposed pillars 17. The members 20 may be relatively light in weight, and with this end in view may be apertured as shown in Figure 5, these members being preferably generally U-shaped in section with the flanges constituting the legs thereof disposed substantially horizontally.

Figure 5 also shows one method of securing the members 20 to the longérons 10 and to the pillar 17. Thus each member 20 may be secured to the longérons by rivets 24 passing through the longérons and lower flange of the member, and by rivets 25 passing through the upper flange of the member, through an inwardly directed flange 26 formed at the upper end of the longéron and a flange 27 formed at the lower end of the associated pillar 17. The upper flange of each member 20 may be further secured to the flange 27 of the pillar as indicated at 28. At its upper edge each pillar 17 is provided with a flange 30 which may be spot-welded as indicated at 31 to the adjacent longéron 15 and riveted thereto as indicated at 32.

Extending between and butt-welded to the lower edges of the longérons 10 is a bottom panel 35 and similarly extending between and butt-welded to the longérons 15 is a roof panel 36. In the rear section of the passenger or lading compartment and aft of the doors 19, the side panels 38 are provided, these panels being likewise butt-welded at their upper and lower edges to the longérons 15 and 10. It will be observed that by means of this construction the outer surfaces of the longérons 10 and 15 constitute a part of the external body surface of the vehicle; the simplicity, lightness, and sturdiness of the resulting structure will be apparent.

With the exception of the transverse structural member 40, which extends across the forward end of the body immediately forward of the road wheels 11, the entire body structure in front of the door 18 and the foremost pillars 17 may be formed of the relatively thin sheet metal which is commonly used for exterior vehicle panels. Thus, as shown more particularly in Figure 3, a single piece of sheet metal 42 may be bent to form the instrument panel 43 and the dash 44, this member extending between the lower edge of the windshield 16 and the transverse member 40, being welded to the latter as indicated at 41. A suitable wheel housing 48 may be formed integral with or rigidly secured to the member 42, and the space above the member 42 and intermediate the wheel housings 48 at either side of the vehicle may serve as a luggage compartment which is accessible through a door 49 provided in an opening in the exterior panel 50 which forms the blunt rounded nose of the body. The panel 50 may be secured by welding at its upper edge to the upper portion of the member 42 at the juncture of the latter with the windshield 16 and may extend downwardly along the side of the vehicle nose, being welded at its forward edge to the lower flange of the transverse member 40 and at its lateral edges to the wheel housing 48 and the lateral edge of the dash 44. The bottom panel 35, which closes the underside of the body, is welded to the transverse member 40 as indicated at 52 and preferably extends to the rear of the passenger or lading compartment. A suitable flooring is provided interiorly of the vehicle, and if desired this flooring may be constituted by a single sheet metal member 54, secured at intervals to the inwardly directed flanges 26 of the longérons 10 as indicated at 55 by riveting or in any other convenient manner. The flooring may extend to the extreme rear of the passenger or lading compartment and may be deflected upwardly at its forward end as indicated at 57 to form a toeboard which is secured as by welding at 58 to the dash 44. To facilitate illustration, this flooring is omitted from Figures 1 and 2 of the drawings.

At the rear of the passenger or lading compartment is a transverse sheet metal member 60 which is disposed in a substantially vertical plane and constitutes a fire wall to separate the passenger or lading compartment from the motor and driving mechanism. The rearward ends of the longérons 15 terminate at and may be secured by welding to this wall 60, and the wall may rest on and be secured at its lower edge to a cross frame member 62 which extends transversely of the vehicle, and which may be constructed similarly to the cross frame members 20 and similarly secured to the longérons 10.

A further cross frame member 63 extends between and is secured to the longérons 10 at the rear end of the vehicle and aft of the rear road wheels, and an X-brace structure indicated generally at 67 extends diagonally upward from the points of juncture of the cross frame member 63 with the longérons 10, the upper ends of the X-brace member being secured in any convenient manner to the fire wall 60 adjacent the points of connection of this wall to the longérons 15.

It will be observed that this X-brace structure 67 affords greatly increased resistance to torsional stresses at the rear of the vehicle, serves to carry the roof load directly downwardly to the longérons 10, and at the same time affords adequate clearance to permit the road wheels 12 to rise and fall as the vehicle moves over an irregular road bed. With the exception of the structural elements just described, the entire exterior of the body rearwardly of the wall 60 is formed of thin sheet metal paneling constituting an extension of the side panels 38 hereinbefore referred to, this paneling being shaped so as to provide the upstanding fins 69 at each side of the vehicle. If desired, in order to facilitate the stamping of the panel structure or skin at the rear of the vehicle, this may be formed in separate parts, which parts may be subsequently welded to form a unitary member or may be detachably secured together for ready removal to afford access to the power unit housed thereby.

Each side panel 38 at the rear of the vehicle is cut away adjacent the associated rear wheel 12 to provide a substantially semi-circular opening, and each such opening is normally closed by a cover plate 74, suitable means being provided, for example as indicated in Figure 4, to removably retain this cover plate in position so as to form a smooth continuation of the adjacent portions of the panel 38, it being observed that the lower edge of the cover plates 74 rest on and are supported by the adjacent portions of the longérons 10. When it is desired to remove one of the wheels 12 for tire replacement or repair, the adjacent cover plate 74 is removed, and the wheel may then be withdrawn through the opening thus afforded as indicated in dotted lines in Figure 4. By continuing the longérons 10 past the rear wheels 12 in a substantially straight line, weakening of the frame at this point is avoided and a much lighter structure can be employed to provide the necessary rigidity than if these longérons were deflected inwardly or over the wheels. Again, these longérons serve the function of side bumpers to protect the rear wheels from damage in the event of collision without interfering with smooth air flow laterally of and at the rear of the vehicle.

A power plant comprising a transversely disposed engine 76 and suitable transmission gearing 77 disposed rearwardly thereof is supported intermediate the rear wheels 12 and is suitably connected with a transverse rear axle within an axle housing 79 to drive the wheels. The housings for the motor and transmission gearing are secured together to constitute a rigid unit and this unit may extend between and be supported upon the cross frame members 62 and 63 as shown more particularly in Figure 2 of the drawings. It will be observed that by reason of the absence directly beneath the power plant of any structural members, access may be had thereto from beneath by the removal of a flooring 82, which may be readily detachable and which extends between the members 62 and 63 and between the road wheels 12. Access to the power plant from above can be had, if desired, through a door 84 in the tail of the body. The road wheels 12 may be yieldingly supported for rising and falling movement in any convenient manner. For example, the axle housings and axles may be provided with universal joint connections as at 85, to permit swinging movement thereof, and leaf springs 86, connected to the axle housings, may extend between and be suitably shackled to the cross frame members 62 and 63. It will be understood that the details of the power unit and the wheel suspension form no part of the instant invention.

Having thus described the invention, what is claimed as new and desired to be secured by Letters Patent is:

1. In a motor vehicle body, the combination with longitudinally extending structural members disposed adjacent the upper and lower portions of the body sides, said members having exposed surfaces forming a part of the body exterior, of means extending between certain of said structural members and affording continuations of said exposed surfaces, structural members extending transversely of said body and secured to the lower of said longitudinally extending structural members, and upstanding pillars at each side of said body extending between and secured to the adjacent upper and lower longitudinally extending structural members.

2. In a motor vehicle body, the combination with longitudinally extending structural members disposed adjacent the upper and lower portions of the body sides, said members having exposed surfaces forming a part of the body exterior, of means extending between certain of said structural members and affording continuations of said exposed surfaces, structural members extending transversely of said body and secured to the lower of said longitudinally extending structural members, upstanding pillars at each side of said body extending between and secured to the adjacent upper and lower longitudinally extending structural members, and doors carried by said body, said doors being hingedly supported on certain of said pillars.

3. A motor vehicle having a body and means including front and rear road wheels supporting the body, said body including substantially straight, integral structural members extending longitudinally of the major portion of said body, and the rear portion of said structural members extending aft of said rear road wheels and being disposed adjacent to and directly laterally of the latter.

4. A motor vehicle having a body and means including front and rear road wheels supporting the body, said body including integral structural members extending longitudinally of the major portion of said body, and the rear portion of said structural members extending aft of said rear road wheels and being disposed adjacent to and directly laterally of the latter, panel means supported by and extending upwardly from said members to form the sides of said body, said panel means being provided with openings adjacent said rear wheels of sufficient dimensions to permit the removal of said rear wheels through said openings and over said structural members.

5. A motor vehicle having a body and means including front and rear road wheels supporting the body, said body including generally straight, integral structural members extending longitudinally of the major portion of said body, and the rear portion of said structural members extending aft of said rear road wheels and being disposed adjacent to and directly laterally of the latter, panel means supported by and extending upwardly from said members to form the sides of said body, said panel means being provided with openings adjacent said rear wheels of sufficient dimensions to permit the removal of said rear wheels through said openings and over said structural members, and removable closure means for said openings.

6. In a motor vehicle body, the combination with longitudinally extending structural members disposed adjacent the upper and lower portions of the sides of said body, of X-brace means including a pair of generally straight structural elements, each of said elements extending between and secured to the upper of said members at one side of the body and the lower of said members at the other side of the body.

7. In a motor vehicle body, the combination with longitudinally extending structural members disposed adjacent the upper and lower portions of the sides of said body, of X-brace means including a pair of generally straight structural elements, each of said elements extending between and secured to the upper of said members at one side of the body and the lower of said members at the other side of the body, said elements defining a plane inclined to the vertical and being united adjacent the mid-portions thereof.

8. In a motor vehicle body, the combination with longitudinally extending structural members disposed adjacent the upper and lower portions of the sides of said body, the lower of said members extending rearwardly beyond the upper of said members, means extending between the rearward ends of the upper and lower of said members to form a downwardly sloping rear roof, and X-brace means extending between the rearward ends of the upper and lower members, said X-brace means being disposed beneath said roof.

9. A vehicle body having a downwardly sloping rear roof portion, means associated with said rear roof portion to define beneath the latter a substantially closed chamber, a power propulsion unit disposed within said chamber, rear road wheels extending within said chamber, and X-brace means extending between opposite sides of said rear roof portion and disposed above said power plant and rear wheels.

10. A motor vehicle body including at the forward end thereof a sheet metal member formed to provide a dash and instrument panel, and a second sheet metal member secured to said first member and extending rearwardly therefrom to provide a portion of the floor of said body.

11. In a motor vehicle body, the combination with longitudinally extending structural members of metal disposed adjacent the upper portions of the sides of the body and designed to carry the principal portion of the roof load, said members having exposed surfaces forming a part of the body exterior, of means forming a roof extending between and supported principally by said members, said means including a sheet metal panel butt-welded to said members and affording a continuation of said surfaces, the body sides constituting sheet metal panels butt-welded to the lower edges of said members.

FRANK C. BEST.